United States Patent
Liu et al.

(10) Patent No.: US 8,558,903 B2
(45) Date of Patent: Oct. 15, 2013

(54) ACCELEROMETER / GYRO-FACILITATED VIDEO STABILIZATION

(75) Inventors: Yuxin Liu, Cupertino, CA (US); Xiaojin Shi, Fremont, CA (US); James Oliver Normile, Los Altos, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 12/755,620

(22) Filed: Apr. 7, 2010

(65) Prior Publication Data
US 2011/0234825 A1    Sep. 29, 2011

Related U.S. Application Data

(60) Provisional application No. 61/317,642, filed on Mar. 25, 2010.

(51) Int. Cl.
*H04N 5/228* (2006.01)

(52) U.S. Cl.
USPC .................................. 348/208.99; 348/208.4

(58) Field of Classification Search
None
See application file for complete search history.

(56) References Cited

U.S. PATENT DOCUMENTS

| | | | |
|---|---|---|---|
| 2001/0014124 A1* | 8/2001 | Nishikawa | 375/240.16 |
| 2007/0104479 A1* | 5/2007 | Machida | 396/429 |
| 2008/0166115 A1* | 7/2008 | Sachs et al. | 396/55 |
| 2008/0170125 A1* | 7/2008 | Yang et al. | 348/208.4 |
| 2008/0252736 A1* | 10/2008 | McLeod | 348/208.99 |

* cited by examiner

*Primary Examiner* — Justin P Misleh
(74) *Attorney, Agent, or Firm* — Kenyon & Kenyon LLP

(57) ABSTRACT

Embodiments of the present invention provide a control system for video processes that selectively control the operation of motion stabilization processes. According to the present invention, motion sensor data indicative of motion of a mobile device may be received and processed. A determination may be made by comparing processed motion sensor data to a threshold. Based on the determination, motion stabilization may be suspended on select portions of a captured video sequence.

34 Claims, 4 Drawing Sheets

200

400

500

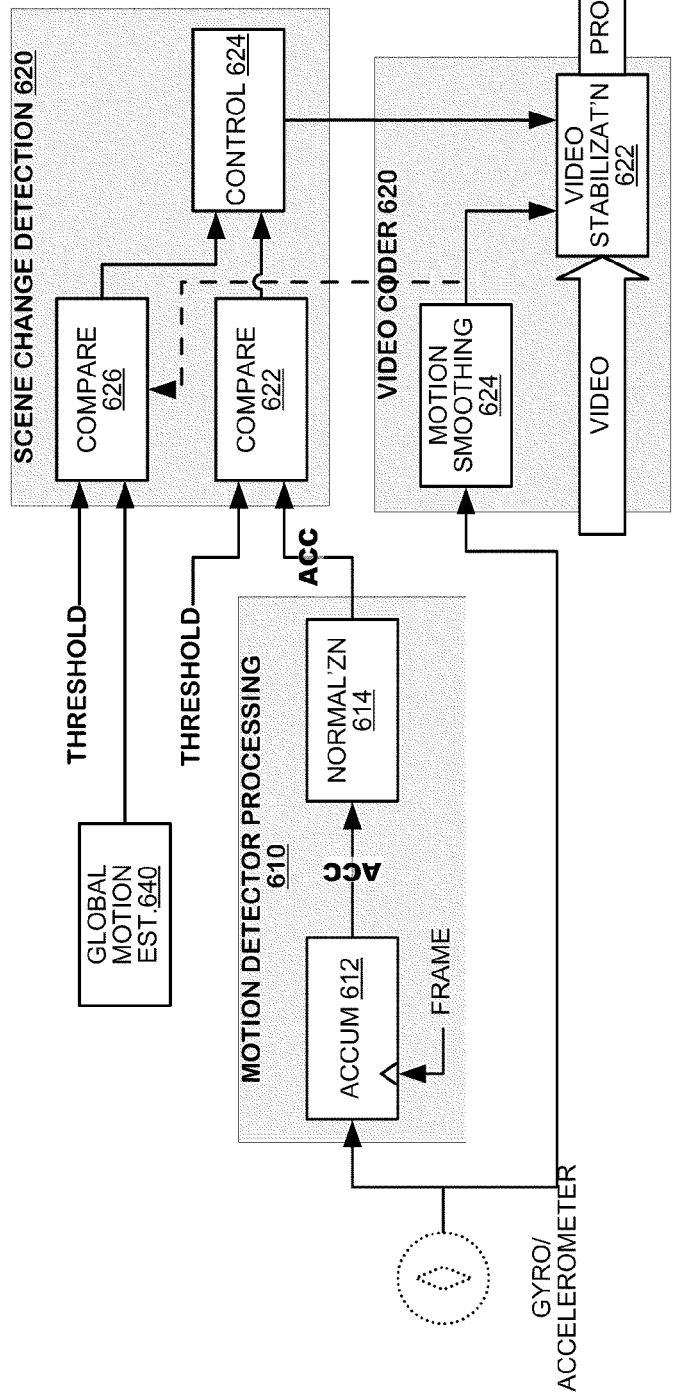

ACCELEROMETER / GYRO-FACILITATED VIDEO STABILIZATION

The present application claims the benefit of U.S. Provisional application Ser. No. 61/317,642, filed Mar. 25, 2010, entitled "Accelerometer/Gyro-Facilitated Video Stabilization," the disclosure of which is incorporated herein by reference in its entirety.

BACKGROUND

Video stabilization is a class of video processing that removes unwanted shakiness from videos captured from portable camera devices such as smart phones, personal entertainment systems laptop computers and/or camcorder. The goal of video stabilization is to revise an original video sequence to mimic a sequence that would have been obtained if a camera captured the video from an ideal or a specified motion trajectory. Specifically, video stabilization techniques generate an idealized motion vector of a captured video sequence and then introduce motion compensation to a sequence of captured video to replicate the idealized motion vector. If, for example, a video stabilization algorithm estimated that a video sequence should exhibit no motion (e.g., ideally a camera would have been perfectly still during motion capture), then the motion compensation processes would estimate a global motion vector on each frame and perform processes to remove the global motion. Although video stabilization can improve the perceptual quality of a video sequence, it has its consequences. First, it can consume considerable resources at a capture device or processing device. Second, it can reduce the field of view of the final video sequence. Third and perhaps most importantly, video stabilization can impair perceived quality if the algorithm generates an incorrect estimate of idealized motion or an incorrect estimate of the source motion vector.

Increasingly, consumer capture devices are provisioned with motion detection devices such as accelerometers and/or gyroscopes. The motion detection devices can provide metadata that indicates motion effects of a camera during video capture, however, even though the motion detectors provide data relating to global motion of the camera, the level of shakiness between frames often is comparable to the noise level of the motion detector data. Such high level of the noise in data prohibits directly use of accelerometer data in video stabilization.

BRIEF DESCRIPTION OF THE DRAWINGS

FIG. 6 is a functional block diagram of a processing system according to another embodiment of the present invention

DETAILED DESCRIPTION

Embodiments of the present invention provide a control system for video processes that selectively control the operation of motion stabilization processes. According to the present invention, motion sensor data indicative of motion of a mobile device may be received and processed. A determination may be made by comparing processed motion sensor data to a threshold. Based on the determination, motion stabilization may be suspended on select portions of a captured video sequence.

Figure 1:
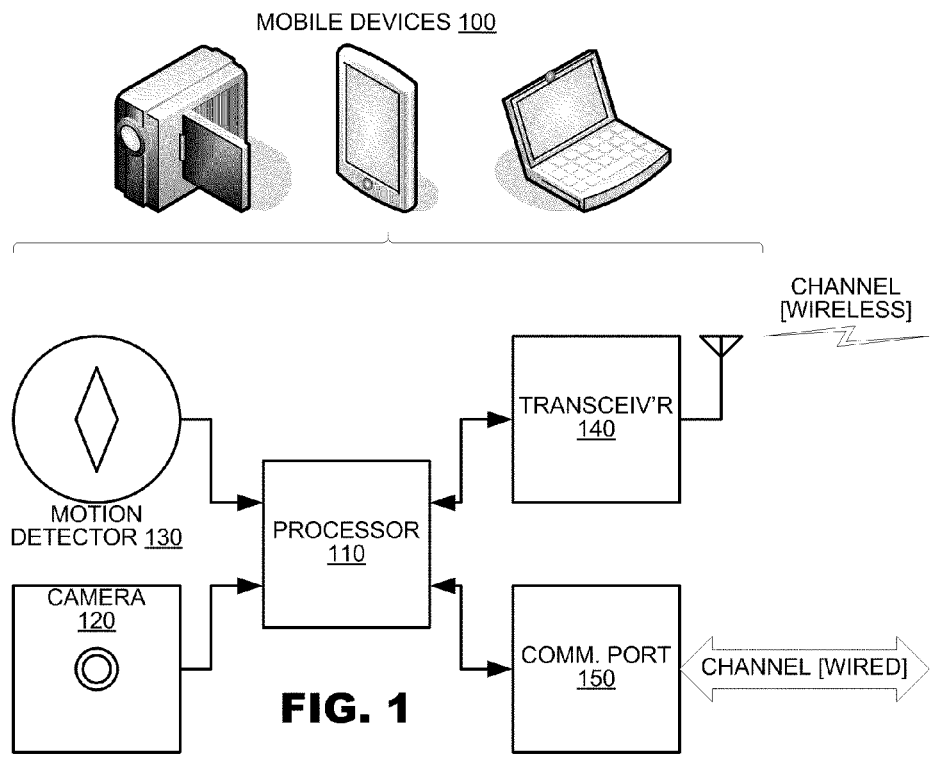
FIG. 1 is a simplified block diagram of a portable video capture device according to an embodiment of the present invention.

FIG. 1 is a simplified block diagram of a portable video device 100 according to an embodiment of the present invention. The video device 100 may include a processing system 110, a camera 120, and a motion detector 130 such as an accelerometer or gyroscope. The processing system 100 may include various microprocessors and memory systems (not shown) to execute an operating system of the video device, to manage device operations and to store and process video data captured by the camera 120. The camera 120 may include a lens system and imaging device to convert incident light into a digital data stream. The motion detector 130 may generate electrical data indicating a direction of movement of the mobile device.

FIG. 1 further illustrates the mobile device 100 as having a transceiver 140 and/or communication port 150 to exchange data between the mobile device 100 and a remote device (not shown). The transceiver 140 may support communication between the mobile device 100 and the remote device by a wireless communication link, such as those formed by 3G, 4G, Wi-Fi or Wi-MAX communication networks. The communication port 150 may support communication between the mobile device 100 and a remote device by wired communication links, for example, those provided by a Universal Serial Bus (USB) communication link.

Figure 2:
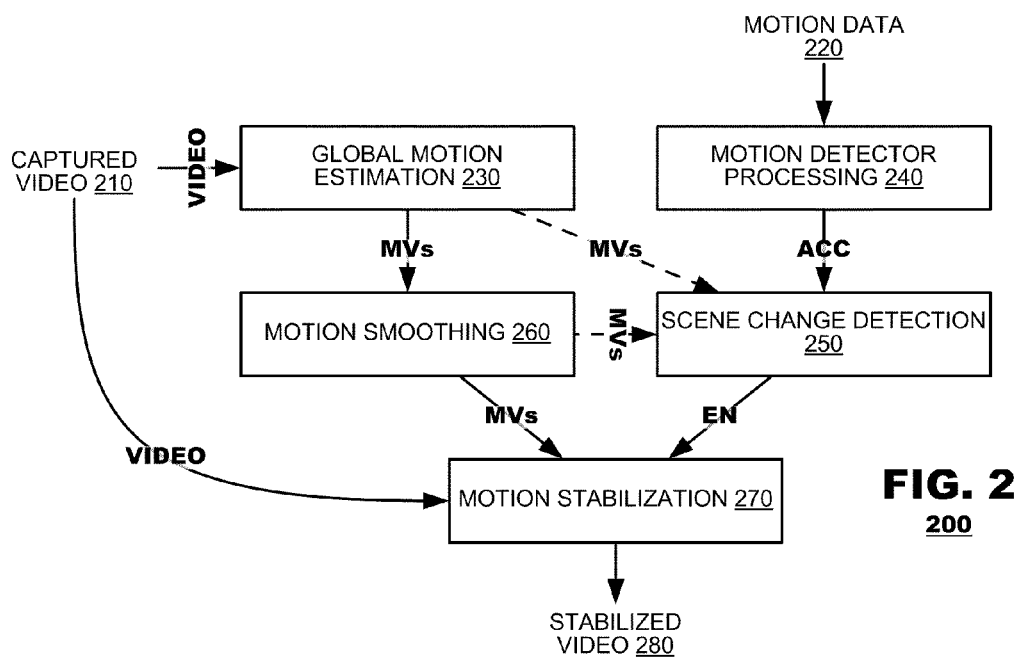
FIG. 2 is a flow diagram illustrating data flow according to an embodiment of the present invention.

FIG. 2 is a process flow diagram 200 illustrating data flow according to an embodiment of the present invention. In this embodiment, captured video data 210 and motion data 220 may be processed by a global motion estimation stage 230, a motion detector processing stage 240, a scene change detection stage 250, a motion smoothing stage 260 and a motion stabilization stage 270.

In the global motion estimation stage 230, a video device may calculate motion of video content on a frame-by-frame basis across a field of view. The global motion estimation stage 230 may output metadata identifying, for each frame in the captured video, a motion vector representing average motion of the frame, measured from a preceding frame. The motion estimate metadata may be output to the motion smoothing stage 260 and the scene change detection stage 250.

The motion smoothing stage 260 may generate new motion vectors for each frame according to average motion observable in the motion vectors output from the global motion estimation stage 230. For example, the motion smoothing stage 260 may generate motion vectors for each frame i representing an average of multiple motion vectors (say, 10 frames) from the global motion estimation stage 230 surrounding and including frame i. Alternatively, the motion smoothing stage 260 may generate motion vectors representing a low pass filtering of multiple motion vectors from the global motion estimation stage 230 (again, perhaps 10 frames). Motion smoothing helps remove jitter and other high frequency artifacts from the motion vectors output by the global motion estimation stage 230. The motion smoothing stage 260 may output motion vectors to the motion stabilization stage 270.

The motion detector processing stage 240 may receive motion data from a motion detector device. The motion detector outputs motion data at rate in excess of one sample per video frame. In some implementations, motion detector samples may be output erratically to the motion detector processing stage 240; some frames may have a relatively large number of motion detector samples provided therefor whereas other frames may have a relatively small number of samples (or none at all). The motion detector processing stage 240 may aggregate and normalize samples on a per frame basis to generate a motion value per frame. The motion data may be output from the motion detector processing stage 240 to the scene change detection stage 250.

The scene change detector 250 may selectively enable and disable operation of the motion stabilization stage 270 based on motion values provided by the motion detector processing stage 240. The scene change detector 250 may identify region(s) of a captured video sequence for which the camera was moving so fast that the camera effectively was in a scene change. During such times, the scene change detector 250 may disable operation of the motion stabilization stage 270. Optionally, as part of its processing, the scene change detector 250 may make scene change decisions based on motion vectors output by the global motion estimation stage 230 or the motion detector processing stage 240.

Figure 3:
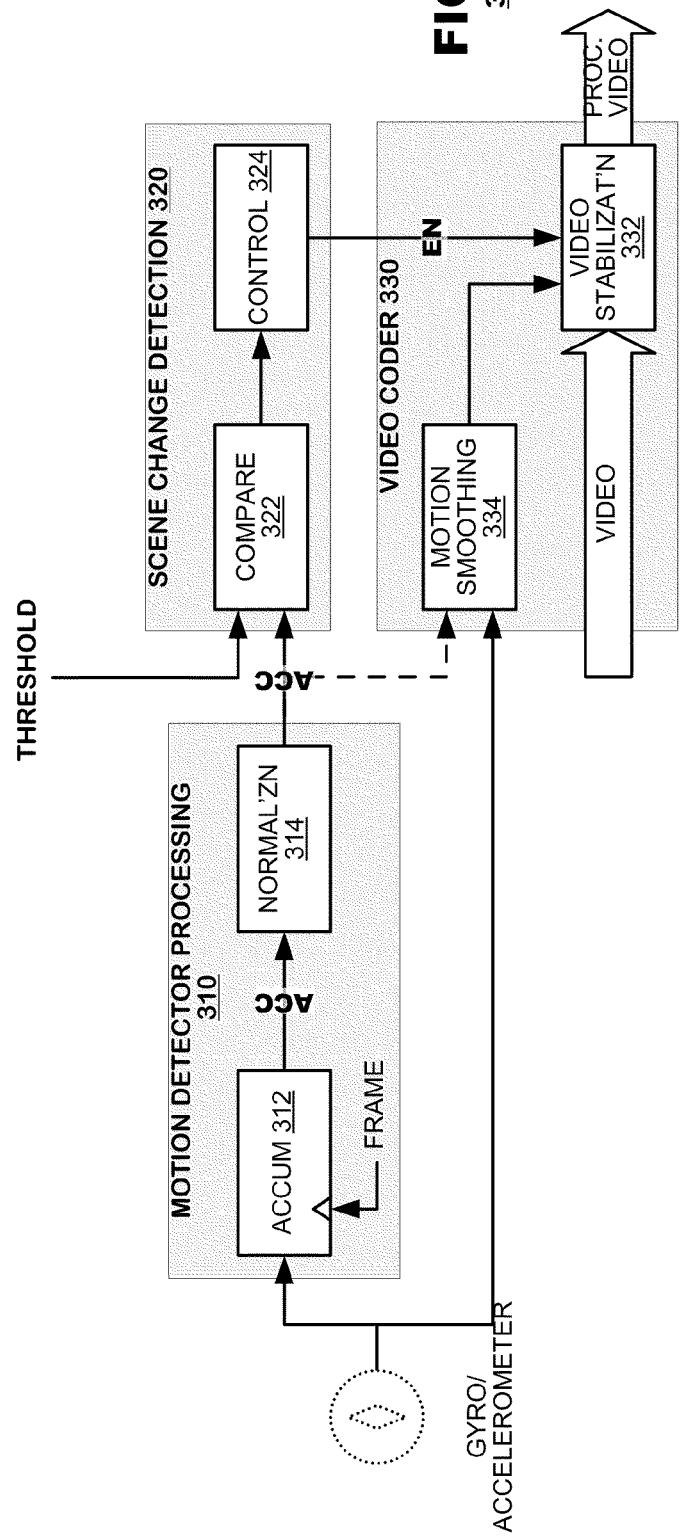
FIG. 3 is a functional block diagram of a processing system according to an embodiment of the present invention

FIG. 3 is a functional block diagram of a processing system 300 for controlling video stabilization processes according to an embodiment of the present invention. FIG. 3 illustrates a motion detector processing stage 310, a scene change detector 320 and a video coder 330. The motion detector processing stage 310 may include an accumulator 312 that receives motion samples from a motion detector, such as a gyroscope or accelerometer. The accumulator 312 may output accumulated motion values ACC to a normalization unit 314. The accumulator 312 may be cleared at the onset of each new frame. The motion detector processing stage 310 may output normalized motion values ACC to the scene change detector 320.

The scene change detector 320 may include a comparator 322 and a codec controller 324. The comparator 322 may compare normalized ACC values from the motion detector processor 310 to a predetermined threshold. It may output a signal representing results of the comparison to the video coder 330 and, specifically, to the video stabilization unit 332. In an embodiment, when the normalized ACC values exceed the threshold, the codec controller 324 may disable the video stabilization unit 332. Optionally, when the codec controller 324 disables the video stabilization unit 332, it may keep the video stabilization unit 332 disabled thereafter for at least a predetermined number of frames (say, 6 frames).

FIG. 3 illustrates a video coder 330 that includes a video stabilization unit 332 and a motion smoothing unit 334. The motion smoothing unit 334 may receive motion samples from the motion detector or, optionally, from the motion detector processor 310 in addition to motion vectors from a global estimation processor (not shown). The motion smoothing unit 334 may output revised motion vectors to the video stabilization unit 332 for use in stabilization processing. In an embodiment, the motion smoothing unit may 334 perform a weighted average of motion vectors from a global estimation processor and from the motion detector processor 310 to generate revised motion vectors to the video stabilization unit 332.

FIG. 3 presents a simplified video coder 330, illustrating only the blocks 332, 334 that are material to the present discussion. When implemented into commercial products, that video coder 330 may include other processing blocks to code input video data. For example a video coder may operate according to any of a plurality of known video compression algorithms that exploit temporal and spatial redundancies in video data to reduce bandwidth of a video signal. The compression algorithms may be lossy or non-lossy. In one implementation, the video compression algorithms may perform motion-compensated prediction in combination with spatial transforms, such as discrete cosine transforms or wavelet decomposition. The known H.263 and H.264 families of video coders are examples of such modern algorithms. Further coding efficiencies may be obtained by performing entropy coding of resulting data. Video coders also can perform various pre-processing operations to adapt input video data for compression operations, including video stabilization among others. The embodiments of the present invention find application with such video coders.

The operation of the normalization unit 314 may be tailored to fit implementation of the motion detector. In some applications, for example, data may be read from the motion detector via an operating system service executing on a processing system at a mobile device. In such an embodiment, motion detector data may be provided to the motion detector processor 610 on an irregular basis. Each frame may have a different number of motion samples associated with it. Some frames may have a relatively larger number of samples associated with them whereas other frames may have many fewer associated samples, possibly no samples at all. Accordingly, the normalization unit may perform a variety of processes to generate uniform ACC values to the scene change detector 320.

In one embodiment, the normalization unit 314 may perform a low pass filter over samples available in each frame. Equivalently, the normalization unit 314 may average samples presented to the motion detector processor 310 in each frame. The normalization unit 314 further may determine whether motion samples are missing entirely from individual frames and, in such an event, the normalization unit 314 may interpolate an ACC value from ACC values of neighboring frames.

In a hardware environment or other implementation where the motion detector processor 310 receives a regular number of motion detection samples on each frame such that normalization processes are not required, the normalization unit 314 may be omitted.

Figure 4:
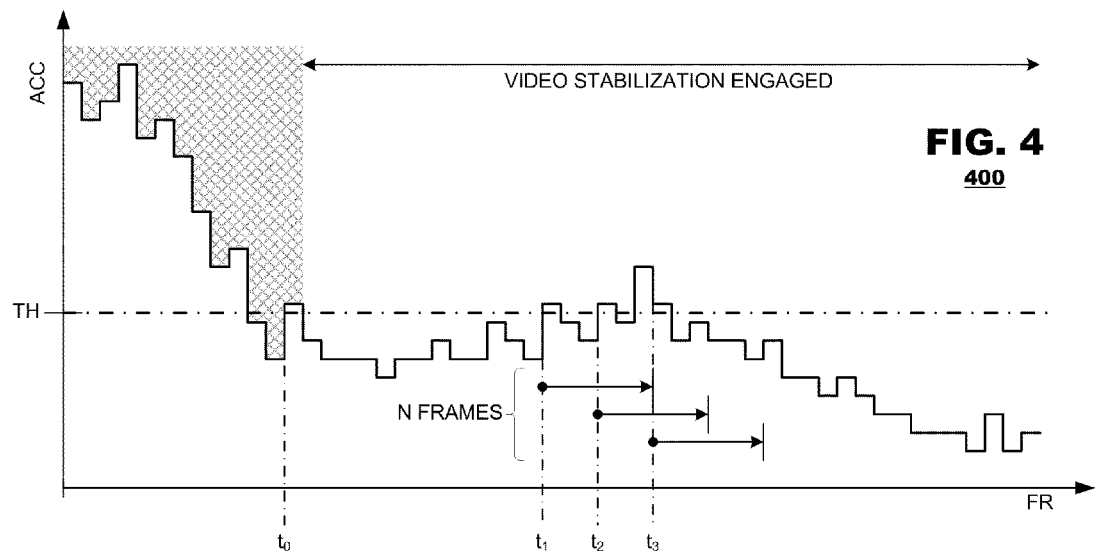
FIGS. 4-5 are graphs illustrating exemplary motion data according to an embodiment of the present invention.

FIG. 4 illustrates a graph of exemplary motion change values over time. As illustrated, the motion change values exceed the predetermined threshold for all frames prior to time $t_0$. At time $t_0$, the motion change values falls below the motion threshold TH. Accordingly, the control unit 350 (FIG. 3) may engage the motion stabilization unit 370 of the codec 360.

After time $t_0$, the motion change values are lower than the threshold TH for all frames until time $t_1$, at which time the motion change value exceeds TH. Due to the latency of the control unit 350, the control unit 350 may maintain the motion stabilization unit 370 in an active mode for at least N frames. After time $t_1$, the motion change value drops below the threshold TH again, resetting the control unit. The motion change values exceed the threshold at times $t_2$ and $t_3$ but, again, drop below the threshold TH within the N frame window that starts at each time. Thereafter, the motion change values remain lower than the threshold TH for the remainder of the time interval shown in FIG. 4. In this example, because the motion change values did not exceed the threshold TH and remain above the threshold for at least N frames for any time following $t_0$, the video stabilization unit remained engaged for all times following $t_0$.

Figure 5:
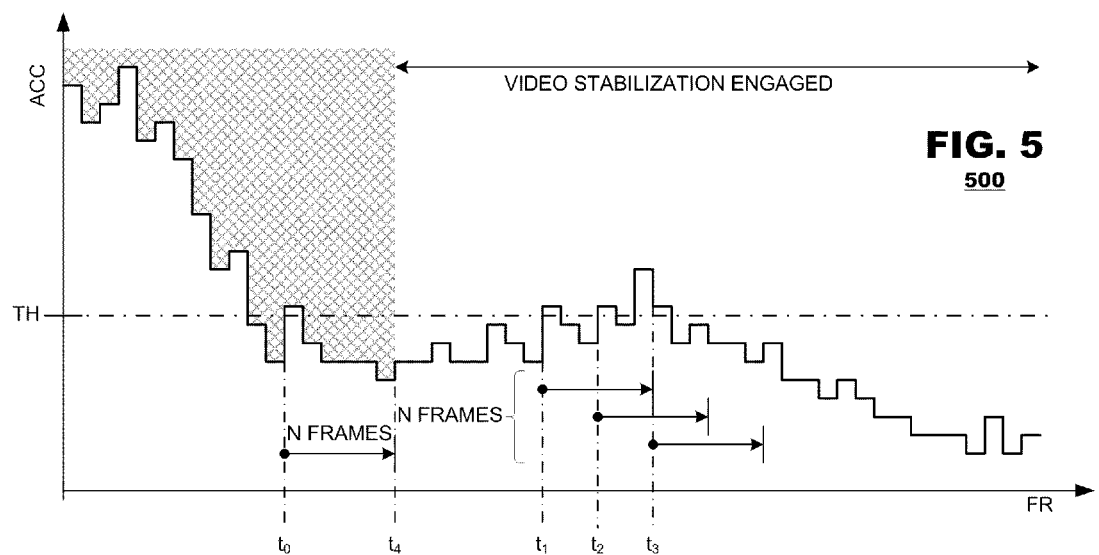

Optionally, a codec controller may employ an N frame latency any time the ACC values cross the TH threshold. FIG. 5 illustrates such operation with the same set of exemplary motion data is illustrated in FIG. 4. As illustrated, the motion change values exceed the predetermined threshold for all frames prior to time $t_0$. At time $t_0$, the motion change values falls below the motion threshold TH. In this embodiment, the codec controller (FIG. 3) may engage the motion stabilization unit 322 if the motion values remain under the TH threshold for at least N frames. Thus, the motion stabilization unit 322 would be engaged at time $t_4$.

The motion change values exceed the threshold at times $t_1$, $t_2$ and $t_3$ but, again, drop below the threshold TH within the N frame window that starts at each time. Thereafter, the motion change values remain lower than the threshold TH for the remainder of the time interval shown in FIG. 5. Thus, the video stabilization unit 322 may remain engaged for all times following $t_0$.

FIG. 6 is a functional block diagram of a processing system 600 for controlling video stabilization processes according to another embodiment of the present invention. FIG. 6 illustrates a motion detector processing stage 610, a scene change detector 620, a video coder 630 and a global motion estimator 640. The motion detector processing stage 610 may include an accumulator 612 that receives motion samples from a motion detector, such as a gyroscope or accelerometer. The accumulator may output accumulated motion values ACC to a normalization unit 614. The motion detector processing stage 610 may output normalized motion values ACC to the scene change detector 620.

The scene change detector 620 may include a pair of comparators 622, 626 and a codec controller 624. A first comparator 622 may compare normalized ACC values from the motion detector processor 610 to a first threshold $TH_1$. It may output a signal representing results of the comparison to codec controller 624. The second comparator 626 may compare motion vectors from the global motion estimator to a second threshold $TH_2$. It may output a second signal representing results of this comparison to the controller 624. The codec controller 624 may disable the video stabilization unit 632 based on these comparisons. For example, the codec controller 624 may disable the video stabilization unit 632 when either of these two comparison signals indicates motion has exceeded their respective threshold. Alternatively, the codec controller 624 may disable the video stabilization unit 632 when both of the comparison signals indicate motion has exceeded the thresholds. Optionally, when the codec controller 624 disables the video stabilization unit 632, it may keep the video stabilization unit 632 disabled thereafter for at least a predetermined number of frames (say, 6 frames).

FIG. 6 illustrates a video coder 630 that includes a video stabilization unit 632 and a motion smoothing unit 634. The motion smoothing unit 634 may receive motion samples from the motion detector or, optionally, from the motion detector processor 610 in addition to motion vectors from the global estimation processor 640 (connection not shown). The motion smoothing unit 634 may output revised motion vectors to the video stabilization unit 632 for use in stabilization processing. Optionally, revised motion vectors may be output to the second comparator 626 in lieu of the motion vectors from the global estimation processor 640. In an embodiment, the motion smoothing unit may 634 perform a weighted average of motion vectors from a global estimation processor and from the motion detector processor 610 to generate revised motion vectors to the video stabilization unit 632.

As in FIG. 3, FIG. 6 presents a simplified video coder 630, illustrating only the blocks 632, 634 that are material to the present discussion. The video coder 620 may include other processing blocks (not shown) to code input video data and reduce bandwidth of the video signal.

As discussed above, the foregoing embodiments provide a coding/control system that estimates motion of a video capture device, estimates the presence of scene changes in video and selectively engages video stabilization processes based thereon. The techniques described above find application in both software- and hardware-based control systems. In a software-based control system, the functional units described hereinabove may be implemented on a computer system (commonly, a server, personal computer or mobile computing platform) executing program instructions corresponding to the functional blocks and methods listed above. The program instructions themselves may be stored in a storage device, such as an electrical, optical or magnetic storage medium, and executed by a processor of the computer system. In a hardware-based system, the functional blocks illustrated above may be provided in dedicated functional units of processing hardware, for example, digital signal processors, application specific integrated circuits, field programmable logic arrays and the like. The processing hardware may include state machines that perform the methods described in the foregoing discussion. The principles of the present invention also find application in hybrid systems of mixed hardware and software designs.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video processing method, comprising:
 capturing video via a camera to generate a captured video sequence,
 aggregating motion sample data from a motion detection device over a period of each video frame in the captured video sequence, the motion sample data being generated by the motion detection device at a rate in excess of one motion sample per video frame and each motion sample generated during the period of a single video frame represents motion of the camera at a different time during the period,
 comparing the aggregated motion data corresponding to an amount of camera motion for each frame to a threshold,
 identifying, based on the comparison, portions of the captured video sequence that represent a scene change, and
 performing video stabilization on portions of the captured video sequence that are outside the scene change.

2. The method of claim 1, wherein the motion detection device is a gyroscope.

3. The method of claim 1, wherein the motion detection device is an accelerometer.

4. The method of claim 1, further comprising normalizing aggregated motion data over each frame.

5. The method of claim 1, further comprising interpolating aggregated motion data for a frame for which motion sample data is unavailable.

6. The method of claim 1, further comprising filtering the aggregated motion data prior to the comparing.

7. The method of claim 1, further comprising:
 performing global motion estimation on the captured video to derive motion data therefrom for each frame,
 comparing the derived motion data to another threshold,
 wherein the scene change identification is based at least in part on the derived motion data comparison.

8. The method of claim 7, wherein the global motion estimation includes estimating a motion vector representing motion of each frame from a preceding frame based on content motion in the frames.

9. The method of claim 1, further comprising:
estimating a motion vector representing motion of each frame from a preceding frame based on content motion between the frames; and
comparing the motion vector to a second threshold.

10. The method of claim 9, wherein the portions of the captured video sequence that represent the scene change includes portions of the video sequence that have the aggregated motion exceeding the first threshold and the motion vector that exceeds the second threshold.

11. The method of claim 1, wherein each motion sample from the motion detection device corresponds to the motion of the whole frame.

12. The method of claim 1, wherein the motion detection device is a motion sensor sensing the motion of the camera.

13. The method of claim 1, wherein aggregating the motion sample data includes summing the motion sample data associated with each frame to provide a single aggregated motion value per frame, the single aggregated motion value representing the motion of the camera of the respective frame.

14. The method of claim 13, wherein comparing the aggregated motion data includes comparing the single aggregated motion value of each frame to the threshold.

15. A video processing method, comprising:
estimating motion of a camera device for each video frame in a video sequence based on motion sample data from a camera motion detector, the motion sample data being generated by the camera motion detector at a rate in excess of one motion sample per video frame to provide a plurality of motion samples for each video frame and each motion sample of the plurality of motion samples for each video frame represents motion of the camera at a different point in time,
comparing the estimated motion of each video frame to a threshold, and
for each frame in a captured video sequence, performing video stabilization on the video sequence if the motion comparisons are below the threshold both for the respective frame and for a predetermined number of frames prior to the respective frame.

16. The method of claim 15, wherein the estimating comprises aggregating the motion sample data over a period of each frame in the captured video sequence.

17. The method of claim 15, wherein the estimating comprises filtering motion sample data over a period of each frame in the captured video sequence.

18. The method of claim 15, wherein the estimating comprises normalizing motion sample data over a period of each frame in the captured video sequence.

19. The method of claim 15, wherein the motion detection device is a gyroscope.

20. The method of claim 15, wherein the motion detection device is an accelerometer.

21. The method of claim 15, further comprising:
estimating a motion vector representing motion of each frame from a preceding frame based on content motion between the frames; and
comparing the motion vector to a second threshold.

22. The method of claim 21, further comprising disabling the video stabilization if it is determined that the motion vector is above the second threshold.

23. The method of claim 22, further comprising:
disabling the video stabilization for at least a predetermined number of frames if the video stabilization is disabled.

24. A video processing method, comprising:
estimating motion of a camera device for each video frame in a video sequence based on motion sample data from a camera motion detector, the motion sample data being generated by the camera motion detector at a rate in excess of one motion sample per video frame to provide a plurality of motion samples for each video frame and each motion sample of the plurality of motion samples for each video frame represents motion of the camera at a different point in time,
comparing the estimated motion of each video frame to a threshold,
when the estimated motion crosses the threshold, determining if the estimated motion remains on a crossed side of the threshold for a predetermined number of frames, and
if so, changing operational state of a video stabilization process respectively between an enabled state and a disabled state.

25. The method of claim 24, further comprising:
estimating a motion vector representing motion of each frame from a preceding frame based on content motion in the frames; and
comparing the motion vector to a second threshold.

26. The method of claim 24, wherein the camera motion detector is one of an accelerometer and a gyroscope.

27. Control apparatus for a video stabilization processor comprising:
a motion detector processor to generate estimated motion of a camera for each video frame in a video sequence based on motion sample data received from a motion sensor, the motion sample data being generated by the motion sensor at a rate in excess of one motion sample per video frame to provide a plurality of motion samples for each video frame and each motion sample of the plurality of motion samples for each video frame represents motion of the camera at a different point in time,
a scene change detector to compare the estimated camera motion to a threshold and to identify scene changes within portions of a captured video sequence based on the comparison, and
a video stabilization unit selectively enabled or disabled based on the identification from the scene change detector.

28. The control apparatus of claim 27, wherein the motion detector processor includes an accumulator to sum motion sample data from the motion sensor.

29. The control apparatus of claim 27, wherein the motion detector processor includes a filter to filter motion sample data from the motion sensor.

30. The control apparatus of claim 27, wherein the motion detector processor includes an interpolator to estimate motion of a frame for which motion sample data is unavailable based on estimated motion of neighboring frames.

31. The control apparatus of claim 27, wherein the scene change detector performs a second comparison of motion estimates derived from the captured video sequence to a second threshold and the scene change identification is based on the second comparison.

32. The control apparatus of claim 27, further comprising:
global motion unit estimating a motion vector representing motion of each frame from a preceding frame based on content motion within the frames and comparing the motion vector to a second threshold.

33. The control apparatus of claim 27, wherein the motion sensor is one of an accelerometer and a gyroscope.

34. Computer readable medium storing program instructions that, when executed by a processor, cause the processor to:
- estimate motion of a camera device for each video frame in a video sequence based on motion sample data from a camera motion detector, the motion sample data being generated by the camera motion detector at a rate in excess of one motion sample per video frame to provide a plurality of motion samples for each video frame and each motion sample of the plurality of motion samples for each video frame represents motion of the camera at a different point in time,
- compare the estimated motion of each video frame to a threshold, and
- for each frame in a captured video sequence, perform a video stabilization process on the video sequence if the motion comparisons are below the threshold both for the respective frame and for a predetermined number of frames prior to the respective frame.

* * * * *